(12) United States Patent
Edwards et al.

(10) Patent No.: US 11,810,176 B2
(45) Date of Patent: *Nov. 7, 2023

(54) METHODS AND SYSTEMS FOR ANONYMIZING AND PROVIDING ACCESS TO TRANSACTION DATA

(71) Applicant: Capital One Services, LLC, McLean, VA (US)

(72) Inventors: Joshua Edwards, Philadelphia, PA (US); Michael Mossoba, Arlington, VA (US); Abdelkader Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 453 days.

This patent is subject to a terminal disclaimer.

(21) Appl. No.: 17/036,320

(22) Filed: Sep. 29, 2020

(65) Prior Publication Data
US 2021/0248660 A1 Aug. 12, 2021

Related U.S. Application Data

(63) Continuation of application No. 16/783,618, filed on Feb. 6, 2020, now Pat. No. 10,825,074.

(51) Int. Cl.
*G06Q 30/00* (2023.01)
*G06Q 30/0601* (2023.01)
(Continued)

(52) U.S. Cl.
CPC ......... *G06Q 30/0631* (2013.01); *G06N 20/00* (2019.01); *G06Q 20/383* (2013.01); *G06Q 30/0238* (2013.01)

(58) Field of Classification Search
CPC .......... G06Q 30/0631; G06Q 30/0238; G06Q 20/383; G06N 20/00
See application file for complete search history.

(56) References Cited

U.S. PATENT DOCUMENTS 5,774,868 A 6/1998 Cragun et al.
9,230,132 B2 * 1/2016 Gkoulalas-Divanis ...... G06F 21/6227

(Continued)

OTHER PUBLICATIONS

GasBuddy LLC, "GasBuddy", available at https://www.gasbuddy.com/, accessed on May 5, 2020 (8 pages).

*Primary Examiner* — Ethan D Civan
(74) *Attorney, Agent, or Firm* — Bookoff McAndrews, PLLC

(57) ABSTRACT

A computer-implemented method for providing presentable transaction data of a product to a user may include obtaining preliminary transaction data of one or more purchasers other than the user; generating itemized transaction data based on the preliminary transaction data; obtaining one or more translation codes from one or more transaction entities; generating standardized transaction data based on the itemized transaction data and the one or more translation codes; retrieving identification data from the standardized transaction data; generating anonymized transaction data based on the standardized transaction data by withholding the identification data; generating presentable transaction data based on the anonymized transaction data; and transmitting, to a device associated with the user, the presentable transaction data.

20 Claims, 6 Drawing Sheets

(51) Int. Cl.
    *G06N 20/00* (2019.01)
    *G06Q 30/0238* (2023.01)
    *G06Q 20/38* (2012.01)

(56) References Cited

U.S. PATENT DOCUMENTS

| | | |
|---|---|---|
| 10,192,217 B1 | 1/2019 | Ellis et al. |
| 10,825,074 B1 * | 11/2020 | Edwards ............... G06Q 20/383 |
| 2011/0191184 A1 | 8/2011 | Blackhurst et al. |
| 2015/0220951 A1 * | 8/2015 | Kurapati ............ G06Q 30/0204 |
| | | 705/7.33 |

* cited by examiner

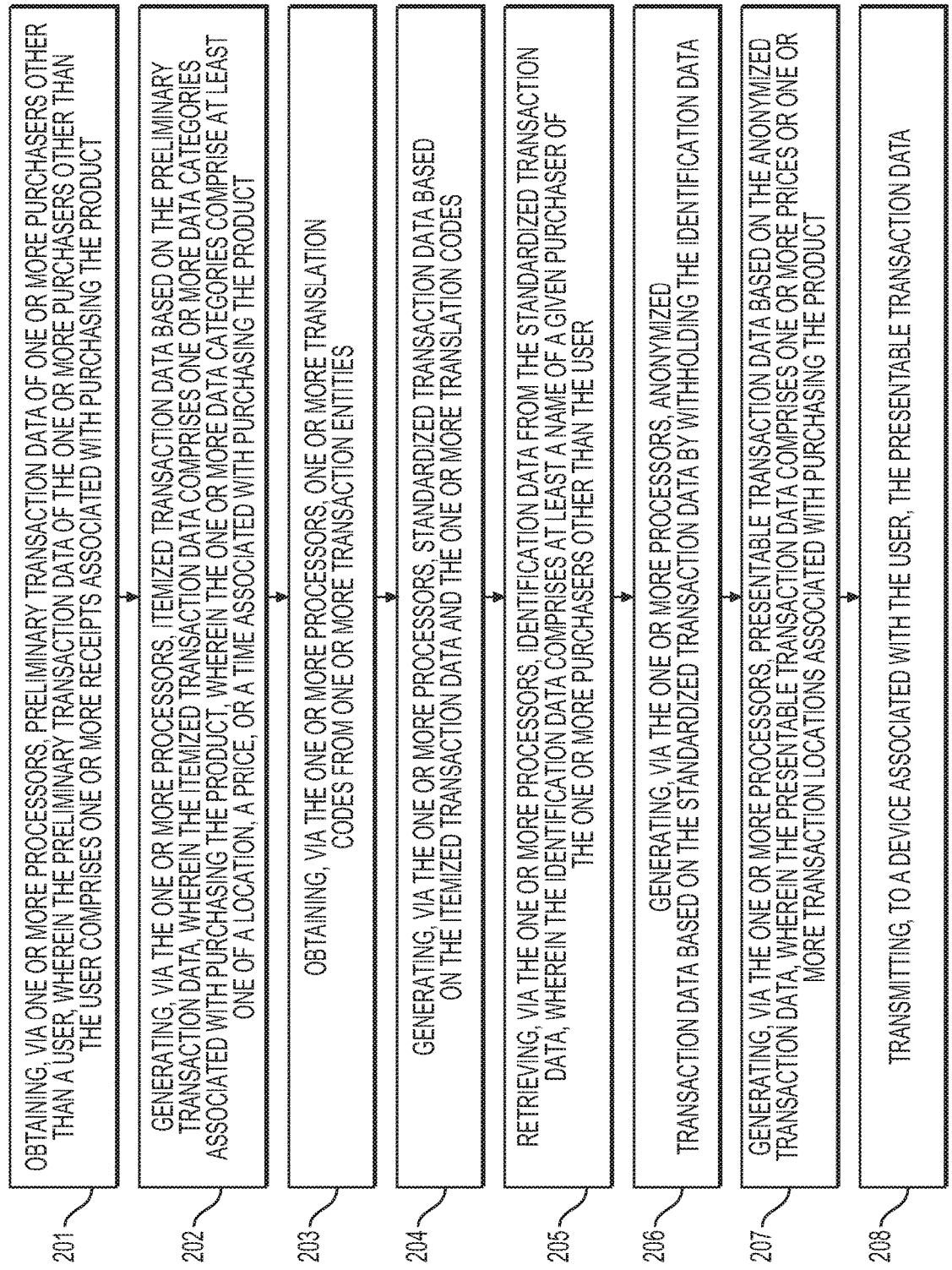

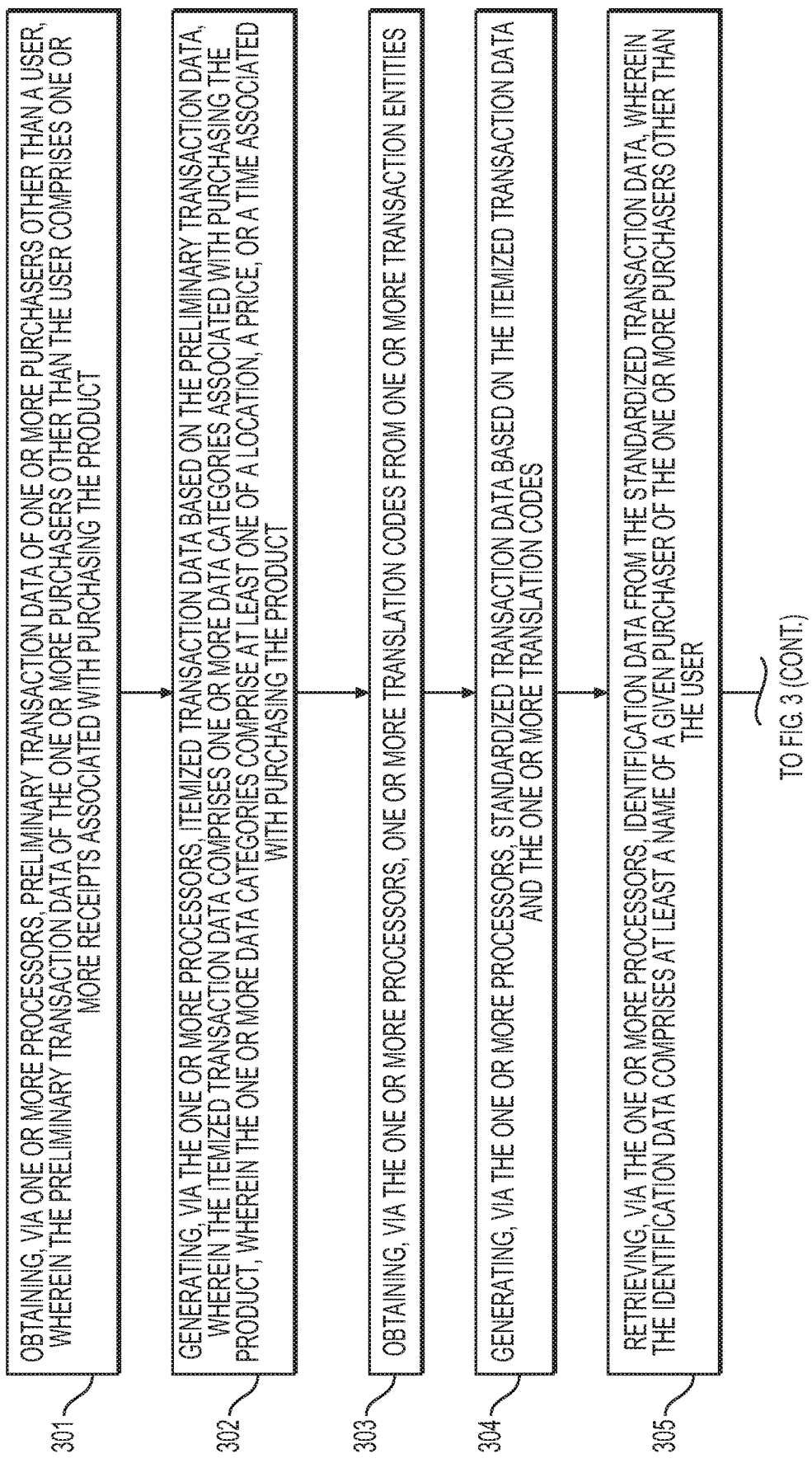

ITEM NAME: WRESTLEMANIA XXXII DVD

TIME RANGE:
● PAST 24 HOURS
○ PAST WEEK
○ CUSTOM RANGE [ ] - [ ]

GEOGRAPHIC AREA: ● WITHIN [15] MILES
○ SELECT ON MAP
☑ INCLUDE ONLINE PURCHASES

☑ GROUP BY MERCHANT

SEARCH $21.25  BEST BUY AT XYZ LOCATION
$22     AMAZON.COM
$22.50  WAL-MART.COM
$23     WAL-MART AT XYZ LOCATION
$23     TARGET AT XYZ LOCATION

*FIG. 4*

METHODS AND SYSTEMS FOR ANONYMIZING AND PROVIDING ACCESS TO TRANSACTION DATA

CROSS-REFERENCE TO RELATED APPLICATION(S)

This patent application is a continuation of and claims the benefit of priority to U.S. Nonprovisional patent application Ser. No. 16/783,618, filed on Feb. 6, 2020, the entirety of which is incorporated herein by reference.

TECHNICAL FIELD

Various embodiments of the present disclosure relate generally to providing access to anonymized item-level transaction data to third parties. More specifically, various embodiments of the present disclosure relate to anonymizing and analyzing item-level transaction data, and to providing such anonymized transaction data to third parties (e.g., customers or other parties) for analysis and/or use in improving shopping experiences.

BACKGROUND

When purchasing a product, a user (e.g., a consumer) may want to search for the lowest price. However, it may be difficult to find the cheapest price online because not all pricing, discount, or coupon information is posted online in an aggregated manner. It may be even more difficult to find or determine the lowest price during an in-store shopping experience. Additionally, even if a user finds a real-time low price either online or in store, it may be difficult for the user to know whether the real-time price could be lowered in the future.

Aspects of the present disclosure may overcome one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing presentable, anonymized transaction data of a product (i.e., "item-level" transaction data) to a user (e.g., a customer or another third-party to the transaction). The methods and systems may provide a mechanism that, among other things, allows users to effectively search for a product with the most favorable price.

In an aspect, a computer-implemented method for providing presentable transaction data of a product to a user may include obtaining, via one or more processors, preliminary transaction data of one or more purchasers other than the user, wherein the preliminary transaction data of the one or more purchasers other than the user includes one or more receipts associated with purchasing the product; generating, via the one or more processors, itemized transaction data based on the preliminary transaction data, wherein the itemized transaction data includes one or more data categories associated with purchasing the product, wherein the one or more data categories include at least one of a location, a price, or a time associated with purchasing the product; obtaining, via the one or more processors, one or more translation codes from one or more transaction entities; generating, via the one or more processors, standardized transaction data based on the itemized transaction data and the one or more translation codes; retrieving, via the one or more processors, identification data from the standardized transaction data, wherein the identification data includes one or more of a name or an account number of a given purchaser of the one or more purchasers other than the user; generating, via the one or more processors, anonymized transaction data based on the standardized transaction data by withholding the identification data; generating, via the one or more processors, presentable transaction data based on the anonymized transaction data, wherein the presentable transaction data includes one or more prices or one or more transaction locations associated with purchasing the product; and transmitting, to a device associated with the user, the presentable transaction data.

In another aspect, a computer-implemented method for providing presentable transaction data of a product to a user may include obtaining, via one or more processors, preliminary transaction data of one or more purchasers other than the user, wherein the preliminary transaction data of the one or more purchasers other than the user includes one or more receipts associated with purchasing the product; generating, via the one or more processors, itemized transaction data based on the preliminary transaction data, wherein the itemized transaction data includes one or more data categories associated with purchasing the product, wherein the one or more data categories include at least one of a location, a price, or a time associated with purchasing the product; obtaining, via the one or more processors, one or more translation codes from one or more transaction entities; generating, via the one or more processors, standardized transaction data based on the itemized transaction data and the one or more translation codes; retrieving, via the one or more processors, identification data from the standardized transaction data, wherein the identification data includes one or more of a name or an account number of a given purchaser of the one or more purchasers other than the user; generating, via the one or more processors, anonymized transaction data based on the standardized transaction data by withholding the identification data; obtaining, via the one or more processors, one or more selection criteria from the user, wherein the one or more selection criteria include at least one of a product name, a time range, or a geographic area associated with purchasing the product; generating, via the one or more processors, presentable transaction data based on the anonymized transaction data and the one or more selection criteria, wherein the presentable transaction data includes one or more prices or one or more transaction locations associated with purchasing the product; generating, via the one or more processors, a purchasing recommendation based on the anonymized transaction data via a trained machine learning algorithm, wherein the purchasing recommendation includes at least one of a future time, a future price, and a future location associated with purchasing the product; and transmitting, to a device associated with the user, the presentable transaction data and the purchasing recommendation.

In yet another aspect, a computer system for providing presentable transaction data of a product to a user may include a memory storing instructions; and one or more processors configured to execute the instructions to perform operations. The operations may include obtaining preliminary transaction data of one or more purchasers other than the user, wherein the preliminary transaction data of the one or more purchasers other than the user includes one or more receipts associated with purchasing the product; generating itemized transaction data based on the preliminary transaction data, wherein the itemized transaction data includes one or more data categories associated with purchasing the product, wherein the one or more data categories include at least one of a location, a price, or a time associated with purchasing the product; obtaining one or more translation codes from one or more transaction entities; generating standardized transaction data based on the itemized transaction data and the one or more translation codes; retrieving identification data from the standardized transaction data, wherein the identification data includes one or more of a name or an account number of a given purchaser of the one or more purchasers other than the user; generating anonymized transaction data based on the standardized transaction data by withholding the identification data; generating presentable transaction data based on the anonymized transaction data, wherein the presentable transaction data includes one or more prices or one or more transaction locations associated with purchasing the product; and transmitting, to a device associated with the user, the presentable transaction data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 2 depicts a flowchart of an exemplary method of providing transaction data of a product to a user, according to one or more embodiments.

FIG. 4 shows graphical representations of an exemplary user interface provided on a user/purchaser device.

DETAILED DESCRIPTION OF EMBODIMENTS

Figure 1:
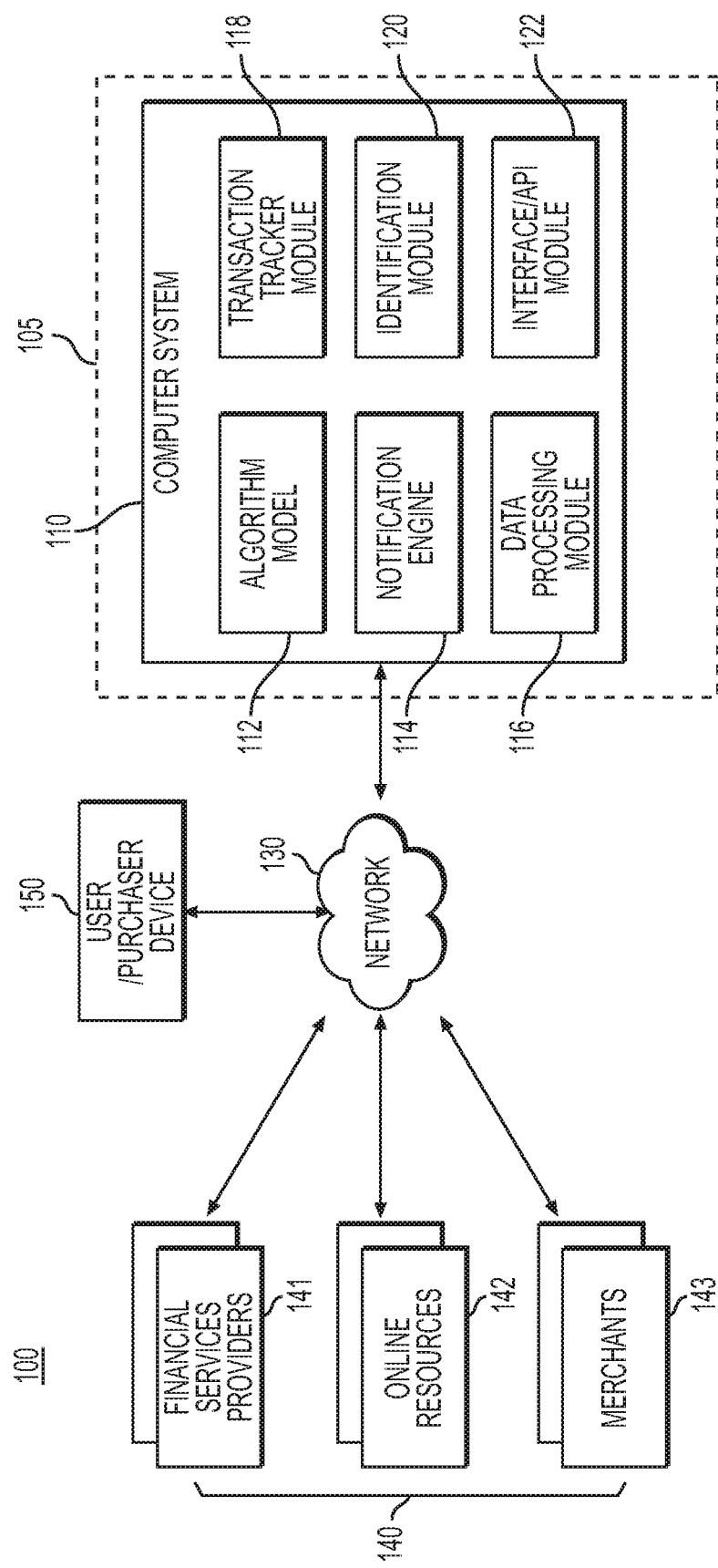
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as preliminary transaction data of one or more purchasers other than the user, itemized transaction data, one or more translation codes, standardized transaction data, identification data, and/or anonymized transaction data may be used to determine presentable transaction data of a product.

As discussed herein, preliminary transaction data may include any original or raw transaction data that are obtained during an action of transaction (e.g., the language on a receipt during purchasing a product). Itemized transaction data may include any transaction data generated based on the preliminary transaction data. For example, the itemized transaction data may include any transaction details including a quantity purchased, a brand name, a shorthand version of the product description, discounts applied, and/or an inventory number. Standardized transaction data may include transaction data obtained from preliminary transaction data that can be understood by a user (e.g., any readable language associated with a transaction) and/or used by, e.g., a computer system, to combine, cross-reference, or index transaction information or transaction data stored in one or more databases. Standardized transaction data may include, e.g., translations of preliminary and/or itemized transaction data into standardized codes, lists, names, etc. to better support combining, indexing and/or cross-referencing multiple transactions from different sources. The standardized transaction data may include private standardized transaction data used to access transaction information stored in one or more databases (e.g., database keys), or may include public standardized transaction data, such as International Standard Book Numbers (ISBNs) corresponding to items in the transaction. Presentable transaction data may include any transaction data that can be presented to (e.g., via a user device), and/or understood by a user. In some embodiments, presentable transaction data may include any transaction data that is intended to serve a purpose to a user, and/or that can be presented to a user without breaching the privacy and/or confidentiality of another user (e.g., a user who participated in a transaction). In some embodiments, presentable transaction data may also be used (e.g., by a user or by a computer system) to determine a purchasing recommendation for a user.

FIG. 1 is a diagram depicting an example of a system environment 100 according to one or more embodiments of the present disclosure. The system environment 100 may include a computer system 110, a network 130, one or more data resources 140 (e.g., preliminary transaction data), and a user/purchaser device (or a device associated with a user) 150. The one or more data resources 140 may include transaction entities such as the financial services providers 141 (including, e.g., enhanced merchant service agencies), the online resources 142, and the merchants 143. These components may be connected to one another via the network 130.

The computer system 110 may have one or more processors configured to perform all or part(s) of methods described in this disclosure. The computer system 110 may include one or more modules, models, or engines. The one or more modules, models, or engines may include an algorithm model 112, a notification engine 114, a data processing module 116, a transaction tracker module 118, an identification module 120, and/or an interface/API module 122, which may each include hardware and/or software components stored in the computer system 110. The computer system 110 may be configured to utilize the one or more modules, models, or engines when performing various methods described in this disclosure. In some examples, the computer system 110 may include a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, one or more modules, models, or engines may be separated into separate, more numerous modules, models, or engines. In some embodiments, some of the one or more modules, models, or engines may be removed while others are added.

The algorithm model 112 may, e.g., include one algorithm model, or may include a plurality of algorithm models. The algorithm model 112 may include, e.g., a trained machine learning model. Details of the algorithm model 112 are described elsewhere herein. The notification engine 114 may be configured, e.g., to generate and communicate (e.g., transmit) one or more notifications (e.g., presentable transaction data) to a user/purchaser device 150 through the network 130. The data processing module 116 may be configured, e.g., to monitor, track, clean, process, itemize, anonymize, or standardize data (e.g., preliminary transaction data) received in the computer system 110. One or more algorithms run by the data processing module 116 may be used to clean, process, itemize, anonymize, or standardize the data. The transaction tracker module 118 may be configured to, e.g., monitor or track transaction information (e.g., preliminary transaction data). For example, the transaction tracker module 118 may retrieve, store, and otherwise aggregate or manage current or historical transaction data or information from the financial services providers 141, the online resources 142, and the merchants 143. The identification module 124 may, e.g., manage identification information for each user or purchaser accessing the computer system 110, possibly including, but not limited to, actual names, usernames, passwords, contact information, and additional information pertaining to the user or the purchaser. The identification information may further or alternatively include preference information, demographic information, previous purchase information, and/or other data related to the particular user or purchaser. In one implementation, the identification information associated with each user or purchaser may be stored in, and/or retrieved from, one or more components of the data storage associated with the computer system 110. The interface/API module 122 may, e.g., allow the user or purchaser to interact with one or more modules, models, or engines of the computer system 110. For example, the interface/API module 122 may include a search engine that a user can interact with to search information of a product.

The computer system 110 may be configured to receive data from various sources (e.g., the financial services providers 141, the online resources 142, the merchants 143, and/or a user/purchaser device 150) in the system environment 100 through the network 130. The computer system 110 may further be configured to utilize the received data by inputting the received data into the algorithm model 112 to produce a result. Information indicating the result may, e.g., be transmitted to a user/purchaser device 150 over the network 130, and/or may be stored on, e.g., the computer system 110. In some examples, the computer system 110 may be referred to as a server system that provides a service including providing the information indicating the result to a user/purchaser device 150.

The network 130 may be any suitable network or combination of networks and may support any appropriate protocol suitable for communication of data to and from the computer system 110 and/or the other components of the system environment 100. The network 130 may include a public network (e.g., the internet), a private network (e.g., a network within an organization), or a combination of public and/or private networks. The network 130 may comprise one or more networks that connect devices and/or components in the network layout to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network 130 may be implemented using cell and/or pager networks, satellite, licensed radio, or a combination of licensed and unlicensed radio.

The financial services providers 141 may include one or more entities such as a bank, credit card issuer, merchant services provider, or other type of financial service entity. In some examples, the financial services providers 141 may include one or more merchant services providers that provide the merchants 143 with the ability to accept electronic payments, such as payments using credit cards and debit cards. In some embodiments, a financial services provider 141 may collect and store transaction information (e.g., preliminary transaction data), one or more translation codes, and/or identification data, and transmit presentable transaction data to the user.

The online resources 142 may include any resources available on or via the Internet, and/or resources that exchange information over the internet, such as a webpage or website, email, apps, or social network sites. The online resources 142 may include electronic transaction data (e.g., electronic receipts) held by a user, a purchaser, or other parties. The online resources 142 may be provided by manufacturers, retailers, consumer promotion agencies, and other entities. The online resources 142 may include other computer systems, such as web servers, that are accessible by the computer system 110. The online resources 142 may be configured to provide any information regarding a user, a purchaser, and/or a transaction, including, but not limited to, a user's or purchaser's profile (e.g., gender, age, social status, list of friends, contacts, calendar, etc.), user's or purchaser's preferences (e.g., hobbies, aspirations, etc.), a time stamp, a geographic location, a transaction amount, a product of the transaction, a discount of the transaction, or any historical or current transaction information regarding a transaction.

The merchants 143 may each be an entity that provides products. In this disclosure, the term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, a charitable organization, or other type of entity that provides products that a consumer or a user may consume. A merchant 143 may have one or more venues that a consumer or a user physically visits in order to obtain the products (goods or services) offered by the merchant.

The merchants 143 and/or the financial services providers 141 may each include one or more computer systems configured to gather, process, transmit, and/or receive data. In general, whenever any of the merchants 143 and the financial services providers 141 is described as performing an operation of gathering, processing, transmitting, or receiving data, it is understood that such operation may be performed by a computer system thereof. In general, a computer system may include one or more computing devices, as described in FIG. 5 below.

The user/purchaser device 150 (e.g., a device associated with a user) may operate a client program, also referred to as a user application, used to communicate with the computer system 110. This user application may be used to provide information to the computer system 110 and to receive information from the computer system 110. In some examples, the user application may be a mobile application that is run on the user/purchaser device 150. In some embodiments, the user application may be provided by and/or associated with one or more data resources 140. In some examples, the user/purchaser device 150 may be an electronic mobile device (e.g., smartphone, tablet, pager, personal digital assistant (PDA)), a computer (e.g., laptop computer, desktop computer, server), or a wearable device (e.g., smartwatches). In further examples, the user/purchaser device 150 may include any other device capable of providing or receiving data. The user/purchaser device 150 may optionally be portable. The user/purchaser device 150 may optionally be handheld. The user/purchaser device 150 may be a device capable of connecting to the network 130, or any other network such as a local area network (LAN), wide area network (WAN) such as the Internet, a telecommunications network, a data network, or any other type of network. The user/purchaser device 150 may be utilized to obtain identification of the user or the purchaser and/or authenticate the user or the purchaser.

The computer system 110 may be owned, operated, and/or part of an entity 105, which may be any type of company, organization, or institution. In some examples, the entity 105 may be a financial services provider. In such examples, the computer system 110 may have access to data pertaining to consumer transactions through a private network within the entity 105, or otherwise related to the entity 105. For example if the entity 105 is a card issuer, the entity 105 may collect and store transactions involving a credit card or debit card issued by the entity 105. In such examples, the computer system 110 may still receive transaction information from other financial services providers 141.

FIG. 2 is a flowchart illustrating a method for providing presentable transaction data of a product to a user, according to one or more embodiments of the present disclosure. The method may be performed by, e.g., part or all of the computer system 110 (e.g., the algorithm model 112), the network 130, the one or more data resources 140, and/or the user/purchaser device 150.

Step 201 may include obtaining, via one or more processors, preliminary transaction data of one or more purchasers other than the user. The preliminary transaction data of the one or more purchasers other than the user may include one or more purchasing records, such as partial or full receipts, statements, or other records associated with purchasing the product. The preliminary transaction data may include transaction information associated with purchasing the product, including, but not limited to, a transaction location, a transaction time (e.g., a date, time of day, season, time of year, etc.), a product identifier (e.g., a serial number, brand name, or other name to identify the product), a transaction amount, characteristics of the product (e.g., a description, weight, or size of the product), a merchant identification (e.g., a code, name, or other description to identify the merchant), and/or transaction vehicle information associated with purchasing the product (e.g., a credit card number, account, card type, account type, or other transaction vehicle information associated with purchasing the product).

The preliminary transaction data may further include any information regarding the one or more purchasers other than the user, including, but not limited to, a purchaser name and/or identifier, contact information (e.g., address, phone numbers, e-mail addresses, etc.), demographic information (e.g., age, gender, marital status, income level, educational background, number of children in household, etc.), transaction preferences (preferences or reviews regarding favorite products and/or services, favorite department stores, etc.), and previous transaction information. The previous transaction information regarding the one or more purchasers other than the user may include a prior transaction time, a prior transaction location, spending profile of the one or more purchasers other than the user, past spending levels on goods/services sold by various manufacturers or merchants, a frequency of shopping by the one or more purchasers other than the user at one or more retail outlets, store loyalty exhibited by the one or more purchasers other than the user, how much the one or more purchasers other than the user spend in an average transaction, how much the one or more purchasers other than the user have spent on a particular collection/category, how often the one or more purchasers other than the user shop in a particular store or kind of store, an estimated profit margin on goods previously purchased, and/or online or offline stores at which the one or more purchasers other than the user have purchased items.

The preliminary transaction data may further include reward data associated with purchasing the product. The reward data associated with purchasing the product may include, but is not limited to a cash back amount or agreement, a discounted price or discount percentage, a customer loyalty reward, an incentive to purchase the product again, an incentive to buy another product similar to the purchased product, an incentive to promote the product, a new customer incentive, a reward to switch away from another retailer or manufacturer, an incentive associated with a particular level or degree of engagement between the user/purchaser and the product or brand, or a reward for a customer that has proven to be more lucrative than others. The reward may be presented, e.g., on a receipt or in a record associated with a product purchase. In this situation, the reward may be recognized and/or obtained as the preliminary transaction data via a natural language processing algorithm.

The step of obtaining the preliminary transaction data of one or more purchasers other than the user may include obtaining the preliminary transaction data of one or more purchasers other than the user from a transactional entity over a network (e.g., the network 130). The transactional entity may include, e.g., one or more merchants 143, financial services providers 141, or online resources 142. For instance, a purchaser other than the user may upload one or more receipts associated with purchasing a product to a server or database associated with a financial service provider via a user application presented on a device associated with the purchaser (e.g., the purchaser uses the device to take one or more images of the receipt). In some embodiments, if the entity 105 operating the computer system 110 is a card issuer or other financial services provider that is involved in processing payment transactions, the computer system 110 may have access to such transactional data associated with one or more purchasers other than the user directly or through a private network within entity 105, and may utilize such information in addition to or alternatively to information from other financial services providers 141. In some embodiments, if the entity 105 operating the computer system 110 is a card issuer or other financial services provider that is involved in processing payment transactions, the entity may include one or more databases to store such preliminarily transaction data (e.g. including purchase location, timing, purchaser identity). In this situation, the step of obtaining the preliminary transaction data of one or more purchasers other than the user may include obtaining the preliminary transaction data from the one or more databases. In some embodiments, during the process of obtaining the preliminary transaction data, a user/purchaser may authorize the transactional entity to upload or share the preliminarily transaction data with other entities (e.g., financial services providers) based on incentives (e.g., a discount or coupon associated with purchasing a product) provided by the transactional entity. For instance, a user/purchaser may be incentivized to authorize a merchant to share the preliminary transaction data associated with purchasing a product with a financial services provider.

The step of obtaining the preliminary transaction data may include providing one or more incentives to the one or more purchasers other than the user. The one or more incentives may include, but are not limited to, a cash back or a coupon associated with purchasing the product if the one or more purchaser other than the user provides the preliminary transaction data. For instance, in order to incentivize the one or more purchasers other than the user to provide the preliminary transaction data (e.g., upload a receipt), the one or more purchasers other than the user may be provided with a coupon code. In some embodiments, the one or more incentives may include an option to obtain presentable transaction data or a purchasing recommendation in the future. For instance, in order for a purchaser or a user to obtain access to presentable transaction data or a purchasing recommendation on a display of a user/purchaser device 150, the purchaser or the user may need to provide preliminary transaction data.

Step 202 may include generating, via the one or more processors, itemized transaction data based on the preliminary transaction data. The step of generating the itemized transaction data may include dividing or otherwise converting preliminary transaction data into one or more item categories (e.g., transaction data pertaining to individual items). A given item category of the one or more item categories may pertain to an individual item that is purchased (in a quantity of one or more) during the transaction. According to the present disclosure, an "item" may be any object or service (e.g., an item of clothing, a luxury item, an overnight hotel stay, an airline ticket, a cleaning service, etc.). A given item category of the one or more item categories may also include one or more data categories, each of which may include information associated with the individual item (e.g., identification of the purchaser and/or seller of the item, transaction vehicle information, the price of the individual item, a quantity of the item purchased, any discounts or coupons applied with respect to the item, etc.). For instance, the preliminary transaction data may include a receipt, and the receipt may include a listing of three purchased video games and one purchased console. In this situation, the itemized transaction data may include four item categories (pertaining to each of the three purchased video games and the one purchased console), where each item category may include one or more data categories associated with the item to which it pertains. The one or more data categories may include, e.g., a location, a price, a time, a product identifier (e.g., a name of the product, or a code associated with the product), a merchant identification (e.g., a name of the merchant), a buyer identification (e.g., buyer's name, contact information or demographic information), a reward (e.g., a discount, coupon, cash back, or incentive associated with the product), transaction vehicle information (e.g., a credit card or account number) associated with purchasing the product, and/or any other data relevant to a purchased item. In some embodiments, instead of or in addition to being divided or otherwise converted into one or more item categories, the preliminary transaction data may be divided or otherwise converted based on one or more data categories. One or more algorithms may be used to generate the itemized transaction data based on the preliminary transaction data. For instance, the one or more algorithms may classify the preliminary transaction data into one or more item categories, where each item category may be associated with a product and include one or more data categories. In an example, if the preliminary transaction data includes a receipt indicating that customer A buys a dress for $50, a shirt for $20, and a hat for $10, then the itemized transaction data may be classified into multiple item categories—one corresponding to the dress, one corresponding to the shirt, and one corresponding to the hat. Optionally, each item category may include additional data, such as a buyer identification (e.g., customer A), a product identifier (e.g., the name, brand, code, and/or description of the item of clothing), and a price (e.g., $50, $20, or $10).

In some embodiments, the one or more algorithms may be used to add more data to the preliminary transaction data or itemized transaction data. For instance, the preliminary transaction data may not include an address associated with purchasing the product, but may include a name of a merchant. In this situation, the one or more algorithms may provide and add the address to the preliminary transaction data or the itemized transaction data associated with purchasing the product based on information regarding the purchaser (e.g., a residence of the purchaser or a favorite department store of the purchaser) and the name of the merchant. In another example, a purchaser may purchase a product via a credit card issued by a financial services provider, and the preliminary transaction data may not include a time associated with purchasing the product, but may include information identifying the product. In this situation, the one or more algorithms may access one or more databases associated with the financial services provider to obtain additional data (e.g., a time) associated with purchasing the product and add such additional data to the preliminary transaction data or the itemized transaction data.

Step 203 may include obtaining, via the one or more processors, one or more translation codes from one or more transaction entities. In some embodiments, the one or more translation codes can be generated or provided internally by the computer system 110, one or more sources 140, and/or by an entity 105 issuing a credit card involved in the transaction of purchasing a product. The one or more translation codes may be used to translate the itemized transaction data into standardized transaction data. The one or more transaction entities may include one or more enhanced merchant service agencies. Enhanced merchant service agencies may include any financial services providers or transaction entities that can process the itemized transaction data or preliminary transaction data, and/or provide standardized transaction data. In some embodiments, any enhanced merchant service agency may be a transaction entity or a financial services provider. The enhanced merchant service agencies may include, e.g., commercial banks (e.g., Capital One® Bank) or financial transaction platforms (e.g., PayPal®). The enhanced merchant service agencies may include the financial services providers that provide a user or a purchaser with a transaction vehicle (e.g., a credit card or a credit account) used to buy the product. In this situation, the enhanced merchant service agencies may be able to gather more information regarding the product or the transaction of purchasing the product than the preliminary transaction data (e.g., a receipt) provided by the purchaser. The one or more translation codes may be associated with one or more transaction categories, including, but not limited to, a payment category (e.g., translation codes for all payment activities that relate to transfer of funds between parties), a foreign exchange category (e.g., translation codes related to a foreign exchange rate), or an account management category (e.g., translation codes transmitting funds from one financial services provider to another financial services provider). Additionally or alternatively, the one or more translation codes may be associated with translating data in an item category or a data category into a standardized format. For example, the one or more translation codes may be used to translate a stock keeping unit (SKU), International Standard Book Number (ISBN), abbreviated term, or other type of item identifier into a fuller listing of an item appearing in transaction data. For instance, a translation code may indicate that a merchant-specific code for an item (e.g., a store code "xb578") may be translated into a more generally recognizable name (e.g., "Fun Racing Game—Console One.") As another example, a translation code may indicate that an ISBN "9780747532743" may be translated to "Awesome Wizard Book, Volume 1." Alternatively, a translation code may indicate that a merchant-specific listing of "Awesome Wizard Book, Volume 1" may be translated to a corresponding ISBN, "9780747532743." The one or more translation codes may thus be used to standardize an abbreviated or situation-specific term or other types of item identifier into a different format for use in standardized transaction data, anonymized transaction data, and/or presentable transaction data. Translation codes may likewise be used to standardize information stored in data categories, such as merchant names, locations, addresses, and the like.

Step 204 may include generating, via the one or more processors, standardized transaction data based on the itemized transaction data and the one or more translation codes. One or more algorithms may be used to generate the standardized transaction data based on the itemized transaction data and the one or more translation codes. The one or more algorithms may translate the itemized transaction data into standardized transaction data based on the one or more translation codes. For instance, the itemized transaction data may include a specific merchant shown as "StoreName XYZ," and the one or more algorithms may translate "StoreName XYZ" into standardized transaction data, which may read "StoreName at 99 H St NW, Washington, DC" via one or more translation codes. In another example, the itemized transaction data provided by purchaser A may include a specific product shown as "Product135A," and the itemized transaction data provided by purchaser B may include a specific product shown as "Product135B." After translation of "Product135A" using an applicable translation code, and "Product135B" using either the same or a different applicable translation code, via the one or more algorithms, the standardized transaction data may show that "Product135A" and "Product135B" are both references to an item known as "Product A," and are therefore the same item.

Step 205 may include retrieving, via the one or more processors, identification data from the standardized transaction data. The identification data may include, for example, one or more of a name or an account number of a given purchaser of the one or more purchasers other than the user. The identification data may further include, for example, a time associated with purchasing the product, an address, an income range, a medical history, a criminal background, or a social security number of the given purchaser of the one or more purchasers other than the user. The identification data also or alternatively may include biometric data, such as a fingerprint, palm veins, face recognition, DNA, palm print, hand geometry, iris recognition, retina pattern, odor/scent, and/or behavioral characteristics, such as typing rhythm, gait, and/or voice. The identification data may further include any information pertaining to the given purchaser of the one or more purchasers other than the user, including, but not limited to, password(s), any contact information (e.g., address, phone numbers, e-mail addresses, etc.), demographic information (e.g., age, gender, marital status, income level, educational background, number of children in household, etc.), employment, and other data related to the given purchaser of the one or more purchasers other than the user.

Step 206 may include generating, via the one or more processors, anonymized transaction data based on the standardized transaction data by withholding (e.g., deleting, redacting, hiding, or separating) the identification data. Withholding the identification data may include withholding the identification data based on a sensitivity level of the identification data. Such a sensitivity level of the identification data may be set by, e.g., a user, a given purchaser, or one or more algorithms. For instance, one or more algorithms may define that a name of a given purchaser of the one or more purchasers other than the user as information with a high sensitivity level, and a merchant address associated with a certain purchase performed by the given purchaser of the one or more purchasers other than the user as information with a low sensitivity level. In this situation, the name of the given purchaser may be withheld and the address may not be withheld. In another example, a medical history-related transaction (e.g., a user needs to buy certain prescribed medication at a specific location) of the given purchaser may be defined as information with a high sensitivity level, and a time associated with a certain purchase performed by the given purchaser as information with a low sensitivity level. In this situation, enough information to obscure the medical history of the given purchaser may be withheld (e.g., the location and/or the specific prescribed medication), and other information (e.g., the time of purchase) may not be withheld.

Step 207 may include generating, via the one or more processors, presentable transaction data based on the anonymized transaction data. The presentable transaction data may include one or more prices or one or more transaction locations associated with purchasing the product. In this situation, the presentable transaction data may be a list including at least a price and respective location associated with the price of purchasing the product. A presentable transaction data layout may be shown in FIG. 4, as described elsewhere herein. The presentable transaction data may include additional details associated with purchasing the product, such as one or more rewards associated with purchasing the product. Such rewards may include a cash back reward, a discounted price, a customer loyalty reward, an incentive to promote the product, a new customer incentive, or an incentive associated with a particular level or degree of engagement between the purchaser and the product or brand obtained at the time of purchasing the product. The presentable transaction data may additionally or alternatively include a tax associated with purchasing the product. In some embodiments, a user may be able to select how information in the layout is displayed. For instance, a user may select to display tax information separately from the actual price of the product (e.g., "price+tax"). In another example, the user may select to display the price of the product as the combination of the actual price and tax. The tax levied for the product may be different in different transaction locations in which the product is sold.

The presentable transaction data may further include any information regarding the one or more purchasers other than the user, including, but not limited to, transaction preferences of a purchaser (preferences or reviews regarding favorite products and/or services, favorite department stores, etc.), and previous transaction information associated with the purchaser. The previous transaction information regarding the one or more purchasers other than the user may include a prior transaction time, a prior transaction location, spending profile of the one or more purchasers other than the user, past spending levels on goods/services sold by various manufacturers or merchants, a frequency of shopping by the one or more purchasers other than the user at one or more retail outlets, how much the one or more purchasers other than the user spend in an average transaction, how much the one or more purchasers other than the user have spent on a particular collection/category, how often the one or more purchasers other than the user shop in a particular store or kind of store, or online or offline stores at which the one or more purchasers other than the user have purchased items.

Prior to generating the presentable transaction data, or at any stage of providing presentable transaction data, the method may further include obtaining one or more selection criteria from the user. The one or more selection criteria may include at least one of a product name, a time range, or a geographic area associated with purchasing the product. The one or more selection criteria may further include any criteria the user may use to filter or select presentable transaction data, including, but not limited to, a product category (e.g., beauty), a preferred language (e.g., English), a preferred delivery method (e.g., delivery or pick-up), a preferred purchasing method (e.g., cash or credit card), a recommendation level (e.g., a review of the product), a brand name, an appearance (e.g., color of the product), a price range, or a demographic range of purchasers other than the user (e.g., age range). Such one or more selection criteria from the user may be obtained via a display screen of a device associated with the user. The one or more selection criteria may be displayed on the display screen in any suitable form, such as an e-mail, a text message, a push presentable transaction data, content on a web page, and/or any form of graphical user interface. The device associated with the user may be capable of accepting inputs of the user via one or more interactive components of the user/purchaser device 150, such as a keyboard, button, mouse, touchscreen, touchpad, joystick, trackball, camera, microphone, or motion sensor. For instance, a user may type a product name in a search box presented on a user interface via a keyboard, or select a time rage among a plurality time ranges presented on a user interface via a mouse. A selection criteria layout may be shown in FIG. 4, as described elsewhere herein.

The method may include generating, via the one or more processors, the presentable transaction data based on the anonymized transaction data and the one or more selection criteria. One or more algorithms may be used to generate the presentable transaction data based on the anonymized transaction data and the one or more selection criteria. The one or more algorithms may filter the anonymized transaction data based on the one or more selection criteria. For instance, if the one or more selection criteria include a product name that is an article of clothing, a time range that is within last 3 months, or a geographic area that is within 30 miles of a user's home address, then the presentable transaction data may include information associated with purchasing the article of clothing that is within last 3 months and within 30 miles of a user's home address.

Step 208 may include transmitting, to a device associated with the user, the presentable transaction data. The presentable transaction data may be configured to be displayed on a display screen of a device associated with the user. The presentable transaction data may be displayed on the display screen in any suitable form, such as an e-mail, a text message, a push presentable transaction data, content on a web page, and/or any form of graphical user interface. The device associated with the user may be capable of accepting inputs of the user via one or more interactive components of the user/purchaser device 150, such as a keyboard, button, mouse, touchscreen, touchpad, joystick, trackball, camera, microphone, or motion sensor. The inputs of the user may include additional selection criteria.

The method may further include, e.g., generating, via the one or more processors, a purchasing recommendation based on the anonymized transaction data via a trained machine learning algorithm. The purchasing recommendation may inform a user of a potential favorable price (e.g., a lower price than average, or a discount on a current price) for a product during a given time, such as a present time window or a time in the future. The purchasing recommendation may include, e.g., at least one of a time or time window, a price, and a location associated with purchasing the product. For instance, based on the anonymized transaction data associated with one or more purchasers other than the user, a purchasing recommendation informing a user to purchase a product at a future time and future location may be provided to the user. Details of the machine learning algorithm are described elsewhere herein. In some embodiments, not all of the steps 201-208 of the method may be performed. For instance, instead of obtaining preliminary transaction data from the one or more purchasers, the preliminary transaction data may be already stored in one or more databases, so a step of obtaining preliminary transaction data may include obtaining preliminary transaction from one or more databases (e.g., databases associated with a financial services provider).

Figure 3:
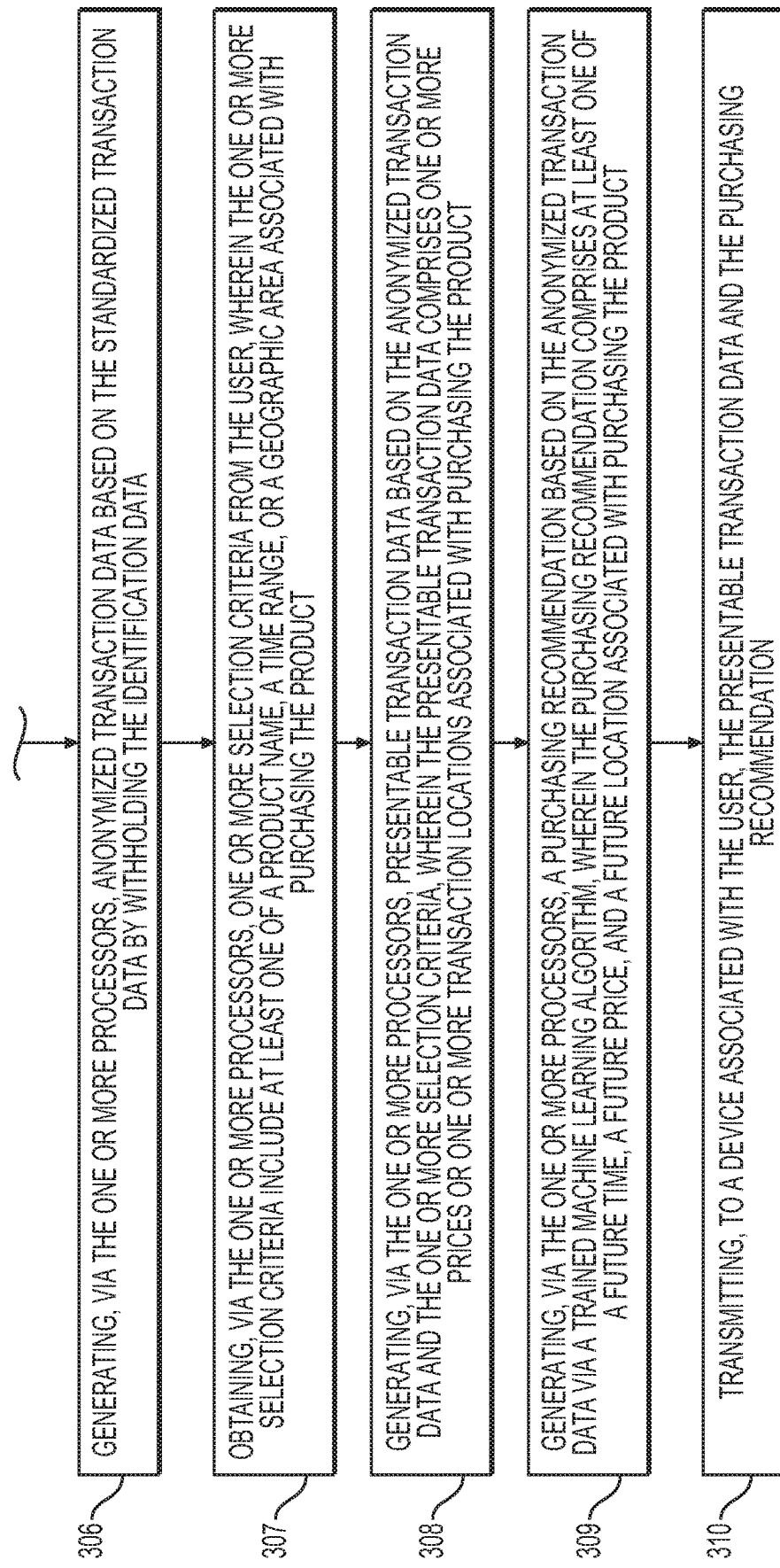
FIG. 3 depicts a flowchart of another exemplary method of providing transaction data of a product to a user, according to one or more embodiments.

FIG. 3 is a flowchart illustrating another exemplary method for providing presentable transaction data of a product to a user, according to one or more embodiments of the present disclosure. The method may be performed by, e.g., computer system 110 (e.g., the algorithm model 112), the network 130, the one or more data resources 140, and/or the user/purchaser device 150.

Step 301, similarly to step 201 of FIG. 2, may include obtaining, via one or more processors, preliminary transaction data of one or more purchasers other than the user. The preliminary transaction data of the one or more purchasers other than the user may include one or more purchasing records, such as partial or full receipts, statements, or other records associated with purchasing the product. The preliminary transaction data may include reward data associated with purchasing the product. The step of obtaining the preliminary transaction data may include providing one or more incentives to the one or more purchasers other than the user. The step of obtaining the preliminary transaction data may include enabling the one or more purchaser other than the user to register with a platform (e.g., an app on a device associated with a purchaser) provided by one or more data resources 140, obtaining identification data of the one or more purchaser other than the user, determining that the one or more purchasers have registered with the platform, enabling the one or more purchasers to perform transactions associated with purchasing the product, and/or gathering the preliminary transaction data associated with transactions associated with purchasing the product via the platform. For instance, a financial services provider may provide an app on a device to enable the purchaser to purchase the product via this app (e.g., online or presenting a digital credit card to purchasing the product), and the purchaser may register with the app and use the app to purchase the product. In this situation, the app may facilitate gathering the preliminary data associated with purchasing the product performed by the purchaser and forward such preliminary data to one or more databases of the financial services provider. Details of the preliminary transaction data and obtaining the preliminary transaction data are described elsewhere herein.

Step 302, similarly to step 202 of FIG. 2, may include generating, via the one or more processors, itemized transaction data based on the preliminary transaction data. The itemized transaction data may include one or more data categories associated with purchasing the product. The one or more data categories may include at least one of a location, a price, or a time associated with purchasing the product. In some embodiments, the itemized transaction data may not include a location or a time associated with purchasing the product. In this situation, such information (a location or a time) may be added via one or more algorithms provided by the one or more resources that are involved in purchasing the product. Details of the itemized transaction data and the one or more data categories are described elsewhere herein.

Step 303, similarly to step 203 of FIG. 2, may include obtaining, via the one or more processors, one or more translation codes from one or more transaction entities. The one or more transaction entities may include one or more enhanced merchant service agencies. Step 304, similarly to step 204 of FIG. 2, may include generating, via the one or more processors, standardized transaction data based on the itemized transaction data and the one or more translation codes. Details of the translation codes, one or more transaction entities, and standardized transaction data are described elsewhere herein.

Step 305, similarly to step 205 of FIG. 2, may include retrieving, via the one or more processors, identification data from the standardized transaction data. The identification data may include, for example, one or more of a name or an account number of a given purchaser of the one or more purchasers other than the user. The identification data may further include a time associated with purchasing the product. Step 306, similarly to step 206 of FIG. 2, may include generating, via the one or more processors, anonymized transaction data based on the standardized transaction data by withholding the identification data. Withholding the identification data may include withholding the identification data based on a sensitivity level of the identification data. Details of the identification data, the sensitivity level and the anonymized transaction data are described elsewhere herein.

Step 307 may include obtaining, via the one or more processors, one or more selection criteria from the user. The one or more selection criteria may include at least one of a product name, a time range, or a geographic area associated with purchasing the product. Details of the one or more selection criteria are described elsewhere herein. Step 308 may include generating, via the one or more processors, presentable transaction data based on the anonymized transaction data and the one or more selection criteria. The presentable transaction data may include one or more prices or one or more transaction locations associated with purchasing the product. The presentable transaction data may include one or more rewards associated with purchasing the product. The presentable transaction data may include a tax associated with purchasing the product. Details of the presentable transaction data are described elsewhere herein.

Step 309 may include generating, via the one or more processors, a purchasing recommendation based on the anonymized transaction data via a trained machine learning algorithm. The purchasing recommendation may include at least one of a future time, a future price, and/or a future location associated with purchasing the product. For instance, based on the anonymized transaction data associated with one or more purchasers other than the user, a purchasing recommendation informing a user to purchase a product at a future time and future location may be provided to the user. In this situation, the user may set up a timed notification (e.g., a notification that will be sent to the user right before the future time). Details of the machine learning algorithm are described elsewhere herein.

Step 310, similarly to step 208, may include transmitting, to a device associated with the user, the presentable transaction data and the purchasing recommendation. The presentable transaction data and the purchasing recommendation may be configured to be displayed on a display screen of a device associated with the user. The presentable transaction data and the purchasing recommendation may be displayed on the display screen in any suitable form, such as an e-mail, a text message, a push presentable transaction data, content on a web page, and/or any form of graphical user interface. The device associated with the user may be capable of accepting inputs of the user via one or more interactive components of the user/purchaser device 150, such as a keyboard, button, mouse, touchscreen, touchpad, joystick, trackball, camera, microphone, or motion sensor. The inputs of the user may include one or more selection criteria. Details of the one or more selection criteria are described elsewhere herein.

FIG. 4 shows a graphical representation of an exemplary user interface 400 that may be provided on the user/purchaser device 150 of FIG. 1, and/or as a part of the methods of FIGS. 2 and/or 3. The user interface 400 may be displayed as, e.g., a website on an internet browser, a display on a mobile app, and/or any other type of display suitable for user interaction. The user interface 400 may be displayed to the user so the user can choose one or more selection criteria. The format and visual characteristics of the user interface 400 are exemplary, and in other embodiments, similar information illustrated in FIG. 4 may be presented in a different format via software executing on an electronic device (e.g., a desktop, mobile phone, or tablet computer) serving as the user/purchaser device 150.

The user interface 400 may include one or more layouts, any or each of which may have interactive components. The one or more layouts may include, e.g., a selection criteria layout 402, and/or a presentable transaction data layout 404. The selection criteria layout 402 may enable the user to select criteria relating to a transaction (e.g., a potential transaction), including, but not limited to, a product name, a time range associated with purchasing the product, and/or a geographic area associated with purchasing the product. In some embodiments, selection criteria may be automatically filled in for a user. In the example depicted in FIG. 4, for example, the selection criteria layout 402 may present an item name (e.g., DVD), a time range (e.g., past 24 hours), group criteria (e.g., the presentable transaction data is grouped by merchant), a method of purchase (e.g., online purchase), and/or a geographic area (e.g., within 15 miles). Any additional or alternative selection criteria may also be presented, such as a target price, a shipping rate, hours of merchant operation, a merchant type (e.g., a franchise or a small business), etc. The presentable transaction data layout 404 may show any information regarding presentable transaction data associated with purchasing a product based on the one or more selection criteria and/or the preliminary transaction data. In this example, the presentable transaction data may include data obtained within a time range of a past 24 hours, within 15 miles of a location (e.g., a location of the user device or of the user, or another location), grouped by merchant, and including online purchase information. The presentable transaction data may include prices and respective transaction locations associated with purchasing a product sharing an item name with the item name specified in the selection criteria. Additionally, the user interface may include one or more graphical elements, including, but not limited to, input controls (e.g., checkboxes, radio buttons, dropdown lists, list boxes, buttons, toggles, text fields, date field), navigational components (e.g., breadcrumb, slider, search field, pagination, slider, tags, icons), informational components (e.g., tooltips, icons, progress bar, notifications, message boxes, modal windows), or containers (e.g., accordion). Any suitable combination of graphical elements may be used in the presentation of the user interface 400.

At any stage of providing presentable transaction data of a product to a user, methods disclosed herein may further include retrieving prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchase the product, prior anonymized transaction data associated with purchasing the product, prior one or more selection criteria provided by the user associated with purchasing the product, prior presentable transaction data associated with purchasing the product, and/or a prior purchasing recommendation associated with purchasing the product; and determining current or future presentable transaction data or current or future purchasing recommendation to the user via a trained machine learning algorithm. The prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchase the product, prior anonymized transaction data associated with purchasing the product, prior one or more selection criteria provided by the user associated with purchasing the product, prior presentable transaction data associated with purchasing the product, and/or the prior purchasing recommendation associated with purchasing the product may be stored in a non-transitory computer-readable medium or one or more databases. The current or future presentable transaction data or current or future purchasing recommendation may be configured to be displayed on a display screen of the device associated with the user (e.g., user/purchaser device 150).

The trained machine learning algorithm may include, e.g., a regression-based model that accepts prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchased the product, prior anonymized transaction data associated with purchasing the product, prior one or more selection criteria provided by the user associated with purchasing the product, prior presentable transaction data associated with purchasing the product, and/or the prior purchasing recommendation associated with purchasing the product as input data. In some embodiments, the trained machine learning algorithm may be part of the algorithm model 112. The trained machine learning algorithm may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The trained machine learning algorithm may compute current or future presentable transaction data or current or future purchasing recommendation to the user as a function of prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchase the product, prior anonymized transaction data associated with purchasing the product, prior one or more selection criteria provided by the user associated with purchasing the product, prior presentable transaction data associated with purchasing the product, and/or the prior purchasing recommendation associated with purchasing the product, or one or more variables indicated in the input data. The one or more variables may be derived from the prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchase the product, prior anonymized transaction data associated with purchasing the product, prior one or more selection criteria provided by the user associated with purchasing the product, prior presentable transaction data associated with purchasing the product, and/or the prior purchasing recommendation associated with purchasing the product. This function may be learned by training the machine learning algorithm with training sets.

The machine learning algorithm may be trained by supervised, unsupervised or semi-supervised learning using training sets comprising data of types similar to the type of data used as the model input. For example, the training set used to train the model may include any combination of the following: prior preliminary transaction data associated with purchasing the product, prior itemized transaction data associated with purchasing the product, prior one or more translation codes associated with purchasing the product, prior standardized transaction data associated with purchasing the product, prior identification data associated with one or more purchasers other than the user who purchase the product, prior anonymized transaction data associated with purchasing the product, prior one or more selection criteria provided by the user associated with purchasing the product, prior presentable transaction data associated with purchasing the product, and/or the prior purchasing recommendation associated with purchasing the product. Additionally, the training set used to train the model may further include user/purchaser data, including, but not limited to, an actual name, contact information (e.g., address, phone numbers, e-mail addresses, etc.), and other data related to the user or purchaser.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110 and/or user/purchaser device 150, may include one or more computing devices. If the one or more processors of the computer system 110 and/or user/purchaser device 150 are implemented as a plurality of processors, the plurality of processors may be included in a single computing device or distributed among a plurality of computing devices. If a computer system 110 and/or user/purchaser device 150 comprises a plurality of computing devices, the memory of the computer system 110 may include the respective memory of each computing device of the plurality of computing devices.

Figure 5:
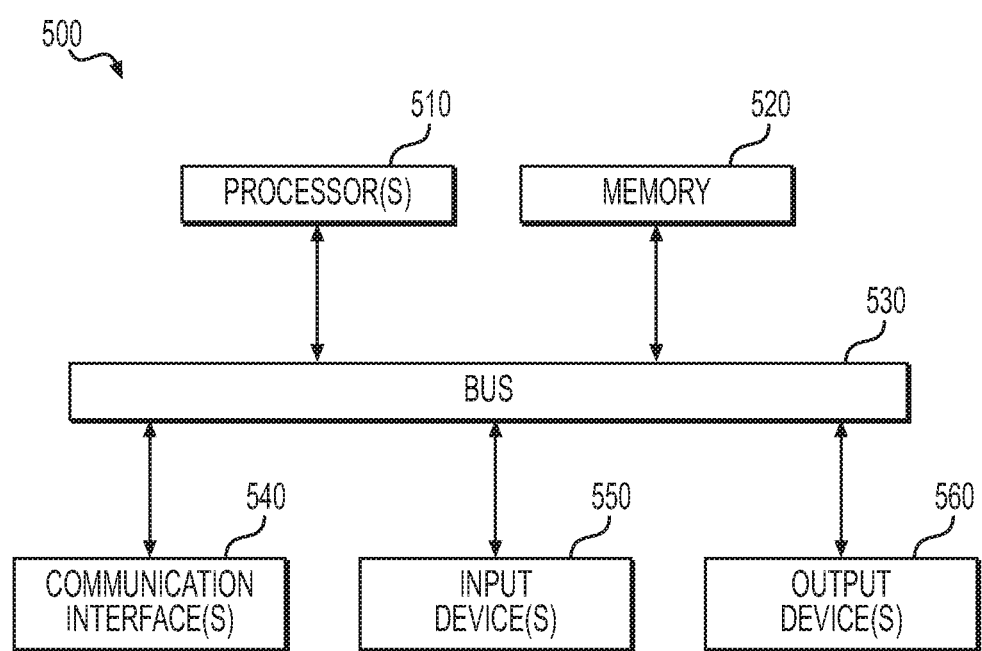
FIG. 5 depicts an example of a computing device, according to one or more embodiments.

FIG. 5 illustrates an example of a computing device 500 of a computer system, such as computer system 110 and/or user/purchaser device 150. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be repeated, added to, or deleted from methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing price comparison data to a user device associated with a user, the method comprising:
    obtaining, via at least one processor, preliminary transaction data including one or more receipts corresponding to one or more executed purchases of a product by one or more persons other than the user, and not including transaction data of the user, wherein the one or more receipts include one or more different categories of data;
    for each of the one or more receipts, identifying, via the at least one processor: (i) one or more of a location, a price, or a time associated with a corresponding executed purchase, and (ii) personally identifying information associated with the person that executed the corresponding purchase;
    generating, via the at least one processor, anonymized transaction data based on the preliminary transaction data by:
        obtaining, from a memory associated with a transaction entity, one or more translation codes that correspond to the one or more categories of data included in the one or more receipts;
        applying the one or more translation codes to the one or more receipts so as to generate standardized transaction data that converts the one or more different categories of data into a standardized form; and
        withholding and/or excluding the identified personally identifying information, wherein the anonymized transaction information includes the identified one or more location, price, or time associated with the one or more executed purchases by the one or more persons other than the user; and
    transmitting the anonymized transaction data to the user device.

2. The computer-implemented method of claim 1, further comprising:
    for each of the one or more receipts, identifying, via the at least one processor, a merchant associated with a corresponding executed purchase.

3. The computer-implemented method of claim 1, wherein the preliminary transaction data includes reward data associated with the one or more executed purchases.

4. The computer-implemented method of claim 1, wherein the anonymized transaction data includes reward data associated with purchasing the product.

5. The computer-implemented method of claim 1, wherein obtaining the preliminary transaction data includes providing one or more incentives to the one or more persons other than the user.

6. The computer-implemented method of claim 1, wherein the anonymized transaction data includes a tax associated with purchasing the product.

7. The computer-implemented method of claim 1, further comprising:
    receiving one or more selection criteria from the user device, wherein the one or more selection criteria includes at least one of a product name, a time range, or a geographic area associated with purchasing the product.

8. The computer-implemented method of claim 7, further comprising:
    prior to transmitting the anonymized transaction data, filtering the anonymized transaction data based on the one or more selection criteria.

9. The computer-implemented method of claim 1, further comprising: generating, via the at least one processor, a purchasing recommendation based on the anonymized transaction data via a trained machine learning algorithm, wherein the purchasing recommendation includes at least one of a future time, a future price, and a future location associated with purchasing the product.

10. The computer-implemented method of claim 1, further comprising:
    determining a sensitivity level of the personally identifying information associated with the person that executed the corresponding purchase;
    wherein, in each case, the withholding and/or excluding the identified personally identifying information is performed based on the determined sensitivity level.

11. A system for providing price comparison data to a user device associated with a user, comprising:
    a processor; and
    a memory storing instructions that are executable by the processor to perform acts, including:
        obtaining preliminary transaction data including one or more receipts corresponding to one or more executed purchases of a product by one or more persons other than the user, and not including transaction data of the user, wherein the one or more receipts include one or more different categories of data;
        for each of the one or more receipts, identifying: (i) one or more of a location, a price, or a time associated with a corresponding executed purchase, and (ii) personally identifying information associated with the person that executed the corresponding purchase;
        obtaining, from a memory associated with a transaction entity, one or more translation codes that correspond to the one or more categories of data included in the one or more receipts;
        applying the one or more translation codes to the one or more receipts so as to generate standardized transaction data that converts the one or more different categories of data into a standardized form;
        generating, anonymized transaction data based on the preliminary transaction data by withholding and/or excluding the identified personally identifying information, wherein the anonymized transaction information includes the identified one or more location, price, or time associated with the one or more executed purchases by the one or more persons other than the user; and
        transmitting the anonymized transaction data to the user device.

12. The system of claim 11, wherein the acts further include:
    for each of the one or more receipts, identifying a merchant associated with a corresponding executed purchase.

13. The system of claim 11, wherein the preliminary transaction data includes reward data associated with the one or more executed purchases.

14. The system of claim 11, wherein the anonymized transaction data includes reward data associated with purchasing the product.

15. The system of claim 11, wherein obtaining the preliminary transaction data includes providing one or more incentives to the one or more persons other than the user.

16. The system of claim 11, wherein the anonymized transaction data includes a tax associated with purchasing the product.

17. The system of claim 11, wherein the acts further include:
receiving one or more selection criteria from the user device, wherein the one or more selection criteria includes at least one of a product name, a time range, or a geographic area associated with purchasing the product; and
prior to transmitting the anonymized transaction data, filtering the anonymized transaction data based on the one or more selection criteria.

18. The system of claim 11, wherein the acts further include:
generating, via the processor, a purchasing recommendation based on the anonymized transaction data via a trained machine learning algorithm, wherein the purchasing recommendation includes at least one of a future time, a future price, and a future location associated with purchasing the product.

19. The system of claim 11, wherein the acts further include:
determining a sensitivity level of the personally identifying information associated with the person that executed the corresponding purchase;
wherein, in each case, the withholding and/or excluding the identified personally identifying information is performed based on the determined sensitivity level.

20. A computer-implemented method for providing price comparison data to a user device associated with a user, the method comprising:
obtaining, via at least one processor, preliminary transaction data including one or more receipts corresponding to one or more executed purchases of a product by one or more persons other than the user, and not including transaction data of the user, wherein the one or more receipts include one or more different categories of data;
for each of the one or more receipts, identifying, via the at least one processor: (i) one or more of a merchant, a location, a price, or a time associated with a corresponding executed purchase, and (ii) personally identifying information associated with the person that executed the corresponding purchase;
obtaining, from a memory associated with a transaction entity, one or more translation codes that correspond to the one or more categories of data included in the one or more receipts;
applying the one or more translation codes to the one or more receipts so as to generate standardized transaction data that converts the one or more different categories of data into a standardized form; and
generating, via the at least one processor, anonymized transaction data based on the preliminary transaction data by withholding and/or excluding the identified personally identifying information, wherein the anonymized transaction information includes the identified one or more merchant, location, price, or time associated with the one or more executed purchases by the one or more persons other than the user;
generating, via the at least one processor, a purchasing recommendation based on the anonymized transaction data, wherein the purchasing recommendation includes at least one of a future time, a future price, and a future location associated with purchasing the product; and
transmitting the anonymized transaction data and the purchasing recommendation to the user device.

* * * * *